United States Patent
Cutler et al.

(10) Patent No.: US 7,522,045 B2
(45) Date of Patent: Apr. 21, 2009

(54) LOCATING ENERGY SOURCES USING LEAKY CONDUCTORS

(75) Inventors: Robert T. Cutler, Everett, WA (US); Laurence Dale Bennett, Mukilteo, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 259 days.

(21) Appl. No.: 11/465,071

(22) Filed: Aug. 16, 2006

(65) Prior Publication Data

US 2008/0042864 A1 Feb. 21, 2008

(51) Int. Cl.
*G08B 13/00* (2006.01)

(52) U.S. Cl. .................. 340/565; 333/237; 340/552; 340/686.6

(58) Field of Classification Search .......... 340/686.6, 340/565–567, 552–554, 539.13; 333/237
See application file for complete search history.

(56) References Cited

U.S. PATENT DOCUMENTS

| | | | | | |
|---|---|---|---|---|---|
| 4,612,536 | A | * | 9/1986 | Harman | 340/552 |
| 4,879,544 | A | * | 11/1989 | Maki et al. | 340/552 |
| 5,199,044 | A | * | 3/1993 | Takeuchi et al. | 375/142 |
| 5,247,270 | A | * | 9/1993 | Harman et al. | 333/237 |
| 5,465,395 | A | * | 11/1995 | Bartram | 455/523 |
| 5,534,869 | A | * | 7/1996 | Harman | 342/27 |
| 2003/0020610 | A1 | * | 1/2003 | Swanson et al. | 340/566 |
| 2003/0216135 | A1 | * | 11/2003 | McDaniel et al. | 455/410 |

* cited by examiner

*Primary Examiner*—Thomas J Mullen

(57) ABSTRACT

Location of an emitter using leaky cables. A two-channel receiver determines the location of an emitter by measuring the phase and/or amplitude difference between emitter signals received by leaky cables. In one embodiment, two leaky cables having different propagation velocities are used. In a second embodiment also suitable for use with fiber optic cables, two cables having the same propagation velocity are used, but have different lengths, the extra length being taken up by serpentine patterns or loops. A single cable in a loop may also be used. The leak points on the cables may be passive, or may be controlled RF switches.

42 Claims, 7 Drawing Sheets

LOCATING ENERGY SOURCES USING LEAKY CONDUCTORS

TECHNICAL FIELD

Embodiments in accordance with the present invention relate to signal location.

BACKGROUND

There are many instances where detecting and locating a source of energy is important. For example, in commercial aircraft there is a concern among pilots and air carriers that personal electronic devices (PEDs) may interfere with aircraft operation and safety. In certain business environments is it important to determine if unauthorized wireless devices are in use in controlled areas. Providing location information on locating transmitters is important in the mining industry.

Standard techniques that can be used to locate emitters in free space often do not work well in confined spaces such as buildings, tunnels, or within aircraft. These techniques often reply on direction antennas (angle of arrival), or signal timing between or among a small number of sense antennas (time difference of arrival).

SUMMARY OF THE INVENTION

A two-channel receiver is used to determine the location of an emitter by measuring the time, phase, and/or amplitude difference between emitter signals received on leaky cables. In one embodiment, a two channel receiver receives signals from two leaky cables having different propagation velocities. In a second embodiment, two leaky cables have the same propagation velocity, but one cable is longer between leak points, for example using serpentine patterns or loops. Other embodiments use a single loop of cable. Leak points may be passive, or may be RF switches.

DETAILED DESCRIPTION OF THE EMBODIMENTS

Figure 1:
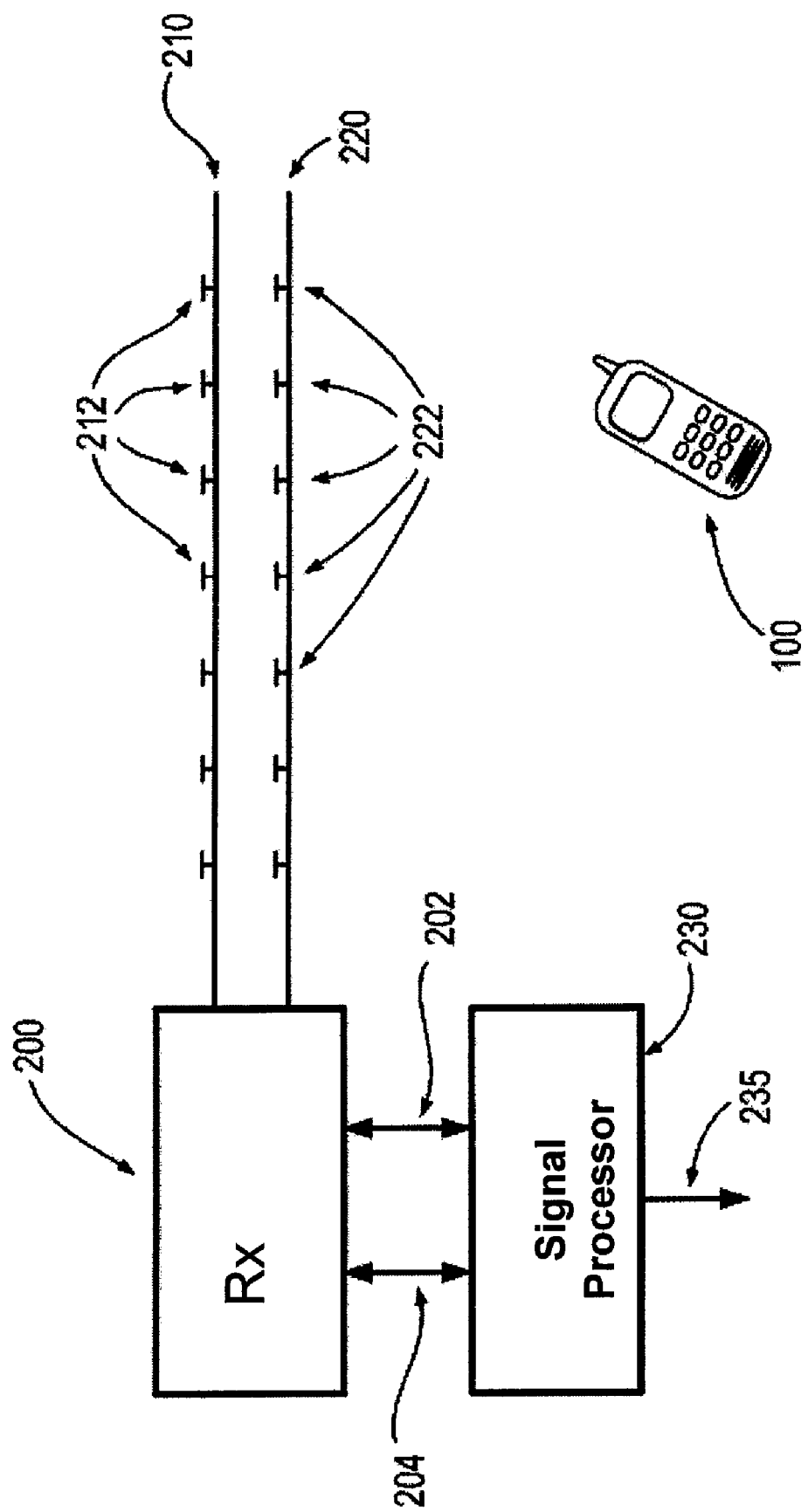
FIG. 1 shows a diagram of a system using two cables with different propagation velocities.

Referring to the embodiment of FIG. 1, emitter 100 dates a signal which is received by two-channel receiver 200. Received signals 202 204 from receiver 200 are processed by signal processor 230. Signal processor 230 measures differences between signals 202 204 and produces distance estimate 235. A velocity estimate may also be produced. Signal processor 230 may be a part of receiver 200, a separate unit, or remote to receiver 200. The two input channels of receiver 200 are fed by leaky signal cables 210 and 220. These leaky signal cables 210 220 serve as antennas, and are run generally close to each other. Cables 210 and 220 are considered leaky as they allow energy to pass through to receiver 200. In the case of coaxial electrical cables, the shielding may be of deliberately low quality, or may be compromised at regular intervals, such as shown by antennas 212 and 222, by notching or otherwise opening the external conductor(s) of the coaxial cable. Particularly for coaxial cables, it may be beneficial to provide termination for cables 210 220 to reduce reflections. For optical cables, leak points 212 and 222 are introduced by exposing the optical fiber and bending it at the desired points 212 222. Cables 210 220 are arranged such that corresponding leak points in the two cables are adjacent.

In the embodiment of FIG. 1, cables 210 and 220 have different propagation velocities. The propagation velocity is the speed at which signals propagate through the medium, usually expressed as a percentage of the speed of light in a vacuum. The propagation velocity of a coaxial cable is related to the type of dielectric material used, and commonly varies from 0.66 to 0.82. Propagation velocities for common twisted-pair networking cables meeting CAT5 or CAT6 specifications are typically in the range of 0.6 to 0.7.

Energy from an emitter 100 will teak into the cables through points 212 222 along the length of the cables, but will be strongest at the point in the cable pair closest to emitter 100. As an example, if the cable pair is run the length of the cabin inside a passenger aircraft fuselage, the largest percentage of energy from a passenger using a cell phone or other wireless device will be at the location where the cable pair passes nearest the offending passenger. The cable pair could also be routed inside the ceiling or walls of a building, in a tunnel, or suspended from poles such as along a border or perimeter.

While more predictable results will be obtained when the cable pair and the associated leak points are closely adjacent to each other, small variations in the separation between cables and leak points is not critical. The degree to which variation may be tolerated will be determined primarily by the wavelengths of interest. The cables may be run separately, as an example separated by a fixed distance, run closely together, or run in a larger cable bundle along with other cables.

According to the invention, the location of an emitter is determined by observing the time difference between signals arriving at two-channel receiver 200. Received signals 202 204 are analyzed by signal processor 230 and the distance 235 determined.

As an example, in the case of FIG. 1, assume the distance from receiver 200 to the maximal signal entry location along leaky cables 210 and 220 is l, the velocity factor of cable 210 is $v_1$ and the velocity factor of cable 220 is $v_2$. Transit times $t_1$ and $t_2$ from l to receiver 200 are therefore:

$$t_1 = \frac{l}{v_1} \quad t_2 = \frac{l}{v_2}$$

Writing the time difference and solving for l, $$t_2 - t_1 = \frac{l}{v_2} - \frac{l}{v_1}$$

$$l = \frac{(v_1 v_2)}{(v_2 - v_1)}(t_2 - t_1)$$

The delay between the two signals can be determined by computing the time difference using cross-correlation techniques, phase differences such as cross-spectrum, combinations, or other analog and digital signal processing techniques known to the art for estimating the delay between two signals.

If phase is estimated, then it must be converted to delay (delay is equal to the derivative of phase with respect to frequency).

Once the time delay between the two signals is calculated, it can be converted to distance using the velocity factors of the cables, and to a location, using the known routing of the cables.

Such measurements assume that the characteristics of receiver 200 are known. In some embodiments, it may be desirable to use a coherent receiver design, or a design incorporating two identical channels. In other embodiments it may be adequate that differences between channel performance are sufficiently characterized that they can be corrected by signal processor 230.

Figure 2:
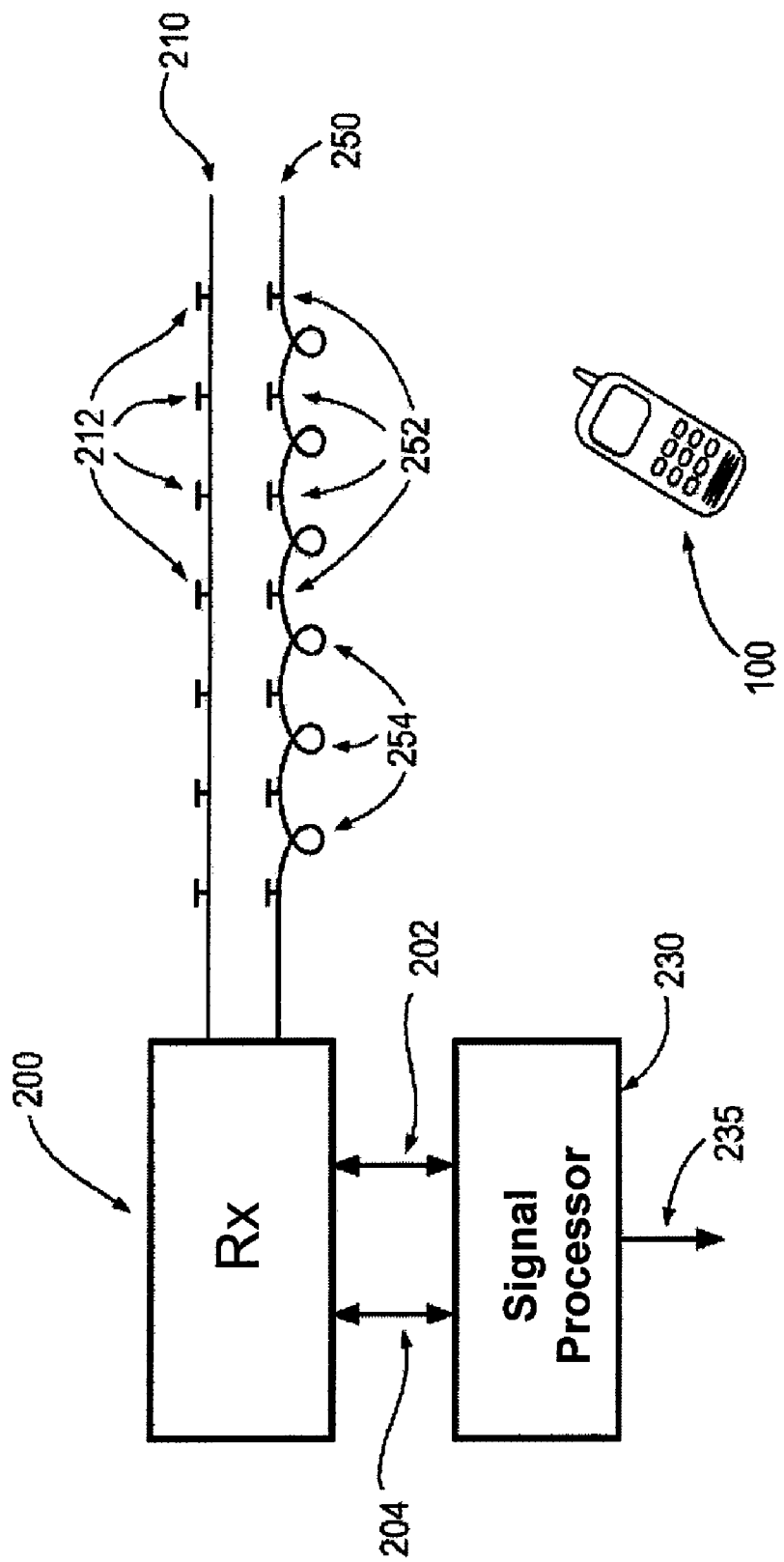
FIG. 2 shows a diagram of a system using two cables with the same propagation velocity.

For the embodiment of FIG. 2, cables 210 250 with the same propagation velocity are used, but the effective length of cable 250 between leak points 252 is increased by looping 254 the cable or running it in a serpentine fashion. As an example, assume leaky cable 210 has leak points 212 at 1 meter intervals. Leaky cable 250 could have leak points at 1.2 meter intervals, with loops or serpentine features 254 used so that corresponding leak points 252 and leak points 212 are adjacent at 1 meter intervals, resulting in a delay difference in signals reaching receiver 200.

It is also possible to use amplitude ratios in determining or improving location estimates. Coaxial cables have a loss factor expressed in dB which is frequency dependent the attenuation increasing with frequency. As an example, a popular coaxial cable, Belden 8237 has approximately 2.35 dB of attenuation per 100 feet at 144 MHz, rising to 8.73 dB at 1296 MHz. Times Microwave LMR-400, a similarly sized cable, has 1.46 dB of attenuation per 100 feet at 144 MHz, rising to 4.72 dB at 1296 MHz. Given that the amplitude response of receiver 200 is well characterized, the amplitude difference of signals between channels may be used to improve location estimates. In an embodiment such as shown in FIG. 2, the difference in amplitude information may be used to improve location estimates. An amplitude-only approach may also be used, determining location based on amplitude ratios at the receiver. This technique is likely to be less accurate than time-based approaches, but may be less expensive to implement; one approach would be to use power detectors in place of two-channel receiver 200. Where timing information is not critical, it may be possible to use a quasi-two channel design using for example a high-speed PIN-diode switch to connect leaky cables 210 220 to a single power detector or a single channel receiver 200, simulating a two-channel design.

As an example, assume a system according to FIG. 1 where propagation velocity $v_1=0.7$ (times the speed of light in a vacuum) for leaky cable 210 and propagation velocity $v_2=0.6$ for leaky cable 220. Assume an attenuation factor for cable 210 of 1 dB/meter, and a loss factor for cable 220 of 1.2 dB/meter at the frequency of interest. Given a CDMA emitter 100 located 10 meters from receiver 200 along leaky signal cables 210 220, the signal from emitter 100 will take 48 nanoseconds (10 meters/(3e8 m/sec*0.7) to reach receiver 200 on cable 210, and 56 nanoseconds (10 meters/(3e8 m/sec*0.6) to reach receiver 200 on cable 220. This results in a time delay difference 202 204 of 8 nanoseconds to signal processor 230. For a modulated signal, the cross-spectrum phase would have an observed slope at processor 230 of 2.88 udeg/Hz, or 3.6 Hz over the 1.25 MHz bandwidth of a CDMA signal. The observed amplitude difference at processor 230 would be 2 dB (10 m*(1.2 dB/m−1 dB/m)).

Figure 3:
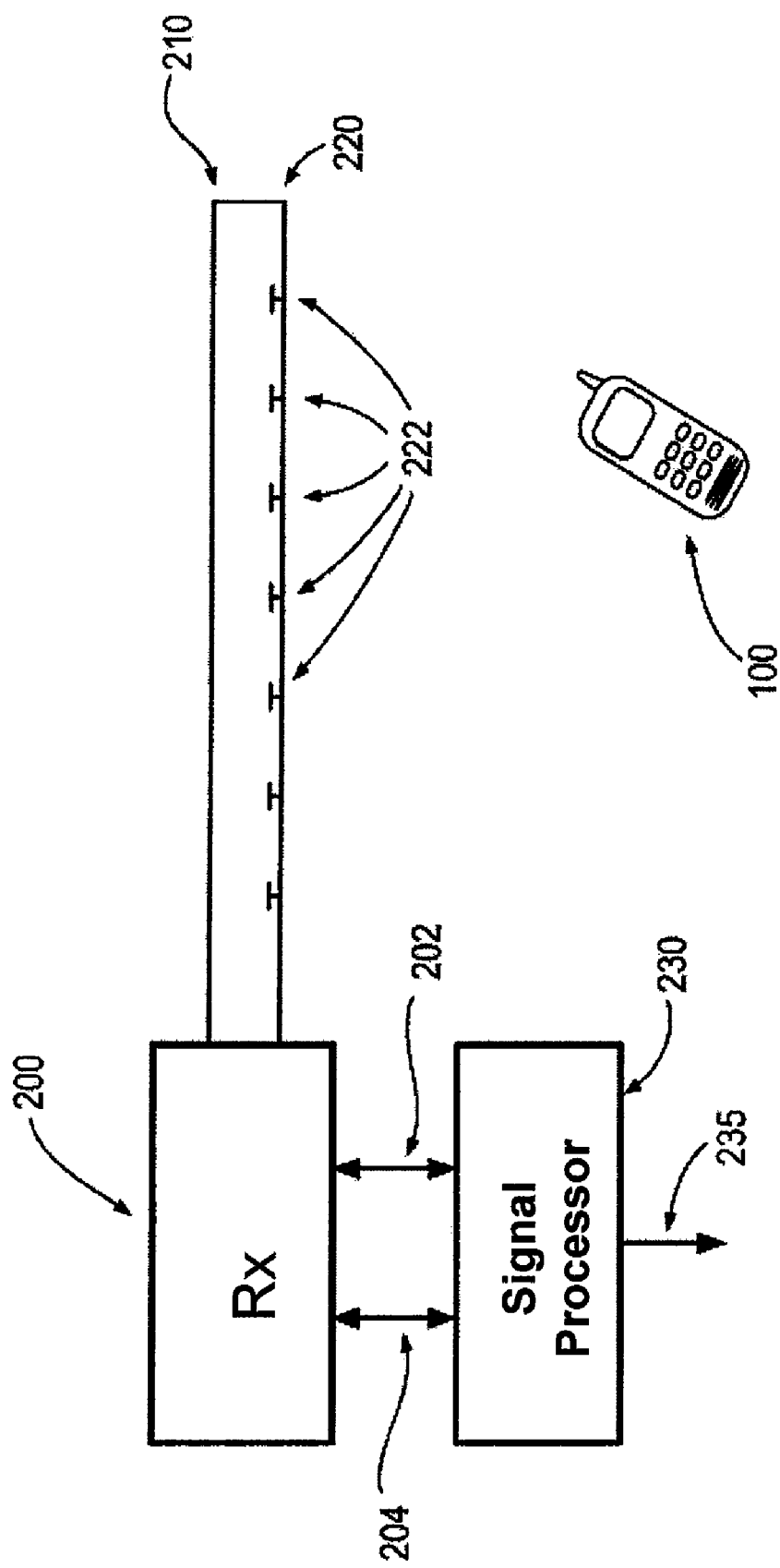
FIG. 3 shows a diagram of a system using a single cable.

The embodiment of FIG. 3 uses a single cable connected to both receiver channels, with only one side 220 of the loop having leak points 222. Difference information is obtained due to the different distance from the entry point to each channel of the receiver in each direction.

Figure 4:
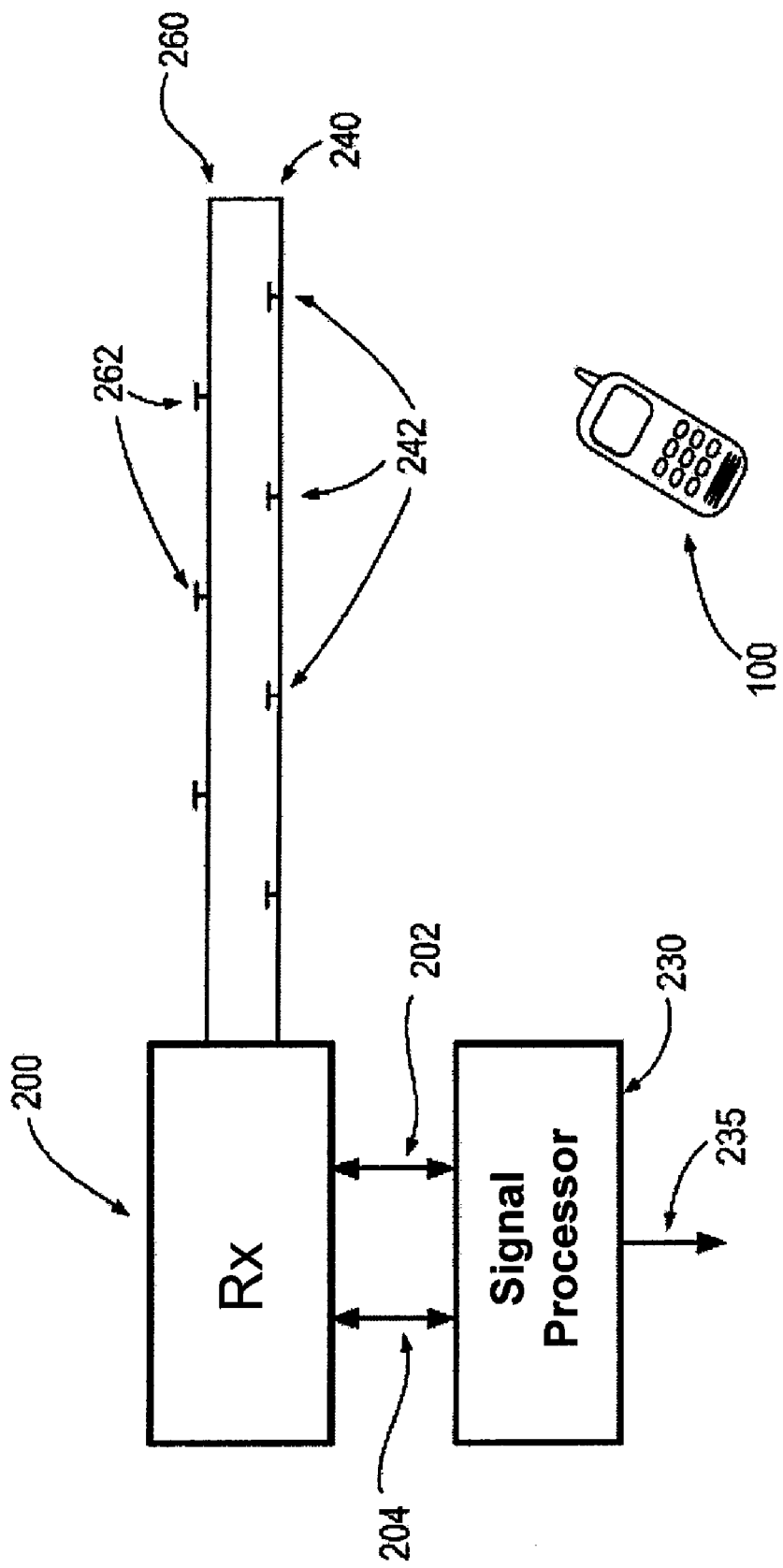
FIG. 4 shows a diagram of a system using a single cable.

The embodiment of FIG. 4 also shows leaky cables 240 260 connected as a loop. In this embodiment leak points 242 262 alternate rather than being adjacent as in the embodiments of FIGS. 1 and 2. This embodiment has limited application when emitter 100 is stationary, as the phase, delay, and amplitude do not change linearly with respect to distance. For moving emitters, this embodiment does offer the advantage that the amplitude and phase seen by receiver 200 and signal processor 230 will be modulated at a rate proportional to the relative motion between emitter 100 and leaky cables 240 260.

Figure 5:
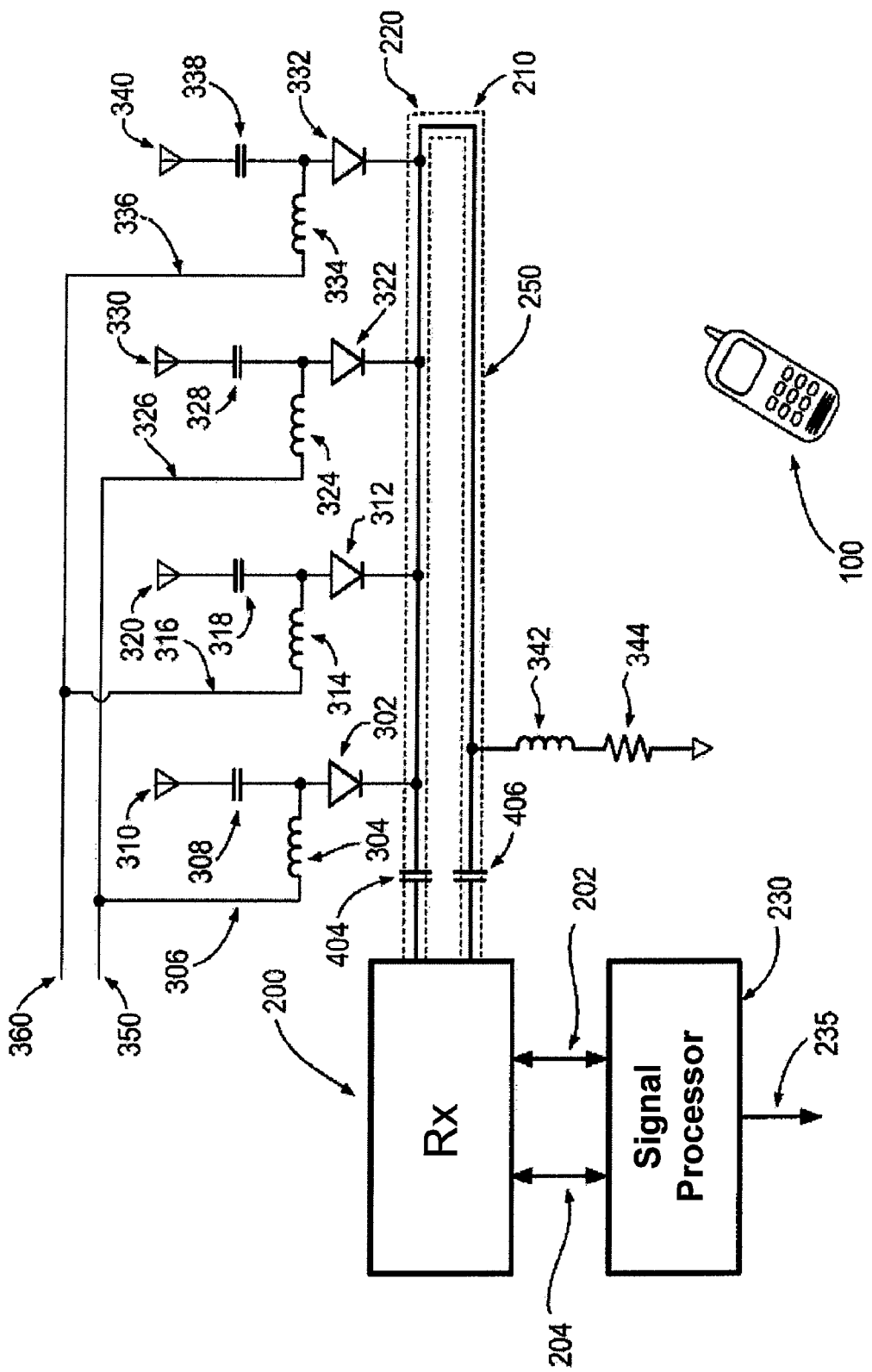
FIG. 5 shows an embodiment using switched nodes.

The embodiment of FIG. 5 uses RF switching diodes such as PIN diodes to provide switched nodes 300 310 320 330. Each switched node has an RF diode switch 302 312 322 332 which presents a high impedance to RF when no current is flowing through the diode, and a low impedance to RF when current is flowing through the diode. One end of diode 302 312 322 332 connects to cable 220. The other end of diode 302 312 322 332 connects to RF choke 304 314 324 334 and capacitor 308 318 328 338. Capacitor 308 318 328 338 provides a low impedance path for RF energy from antennas 310 320 330 340. Choke 304 314 324 334 blocks RF energy but allows DC to pass, from control line 350 tough chokes 304 314, diodes 302, 322, through cables 220 and 210 to RF choke 342 and current limiting resistor 344. This provides a low impedance path for RF from antennas 310 330, and a high impedance path from antennas 320 340. Blocking capacitors 404 406 prevent the flow of DC into receiver 200 while allowing the flow of RF signals; these capacitors may be internal to receiver 200. Similarly, when control line 360 is energized, switched antennas 320 340 provide a low impedance to RF, and switched antennas 310 330 provide a high impedance. Thus switching between control lines 350 and 360 selects different sets of switched nodes for RF detection. Switched nodes may be switched in groups as shown in FIG. 5, alternating or may be enabled in groups according to distance, or individually addressed, depending on the complexity of the driving circuitry. Other RF switching means such as relays may also be used in place of PIN diodes 302 312 322 332.

Figure 6:
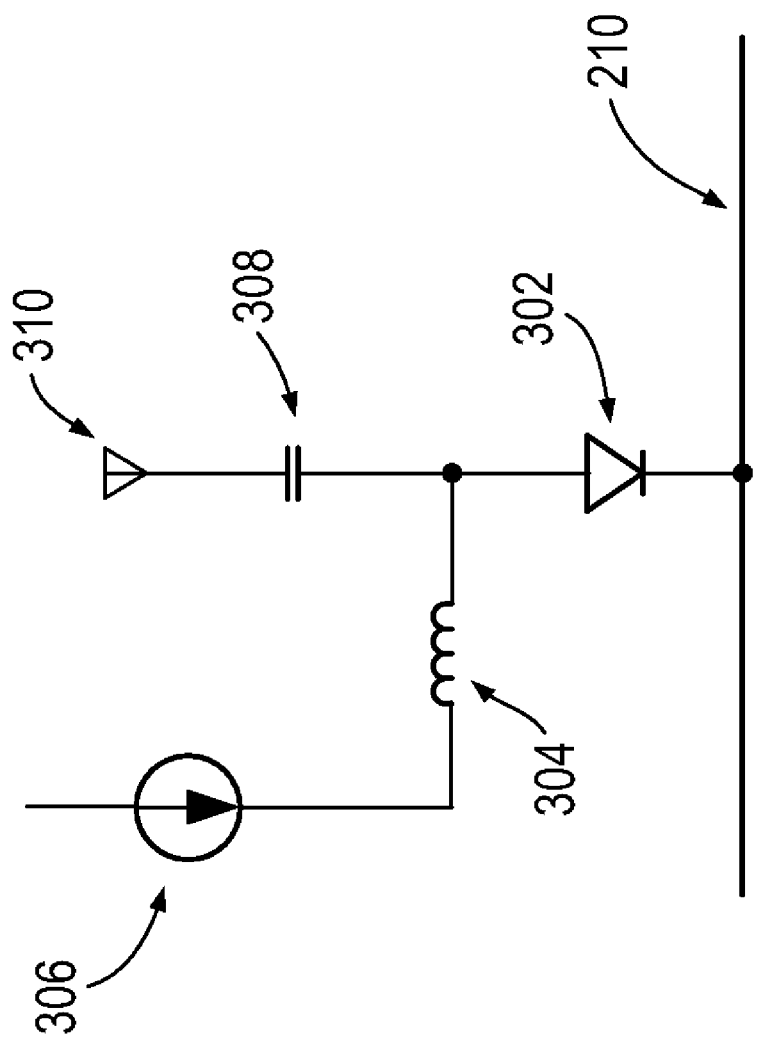
FIG. 6 shows a second embodiment using switched nodes.
Figure 7:
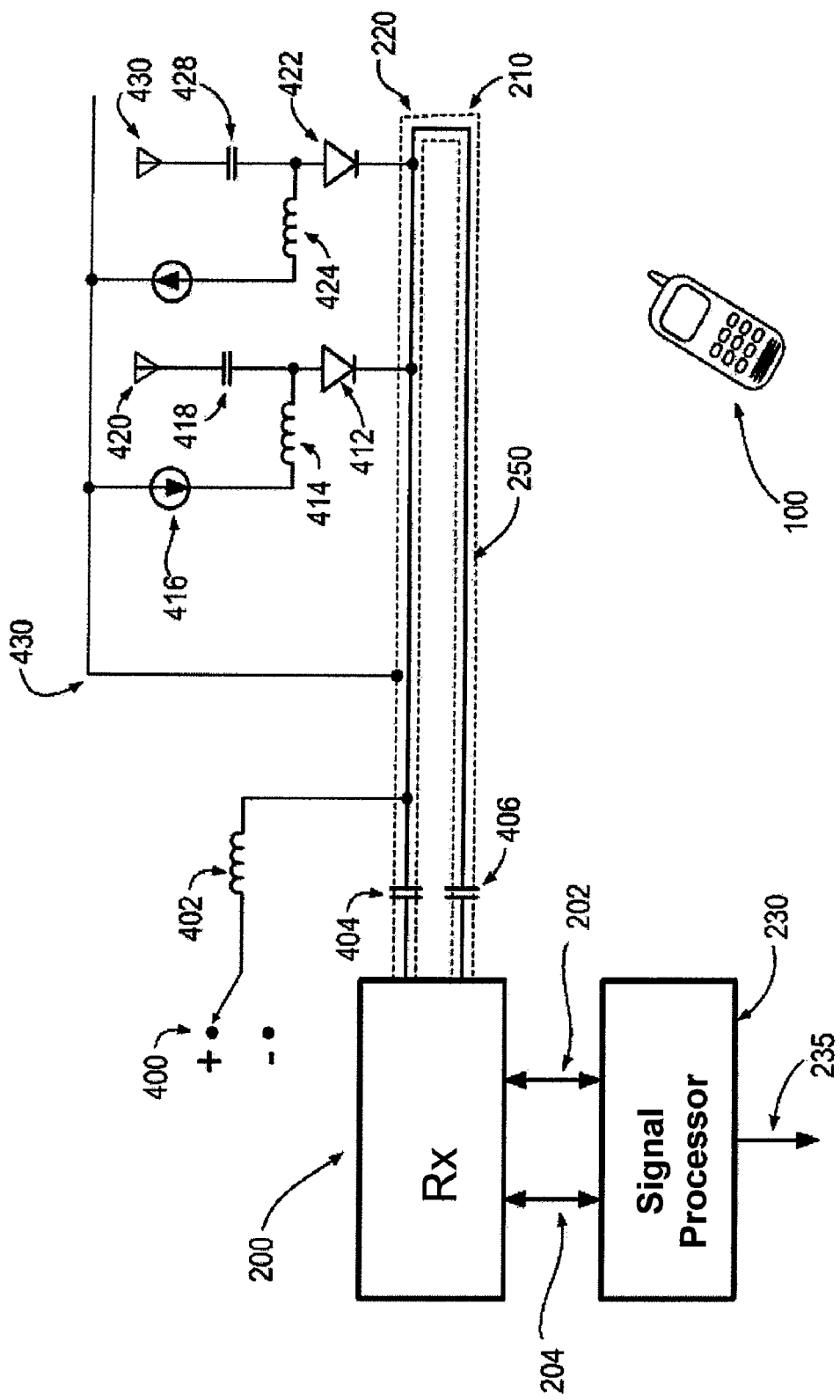
FIG. 7 shows a third embodiment using switched nodes.

In the embodiment of FIG. 6, individual diode current is controlled by introducing constant current source 306 in series with choke 304. Current source may be a constant current diode, a field effect transistor ET) connected as a constant current source, or similar device. By introducing a constant current source at each switched node. the current through active diodes such as diode 302 is controlled by constant current source 306, independent of the resistance of lines 210 220, and the voltage drop resulting from the line resistance and the current draw of other active nodes. If the DC drop along lines 210 220 is easily characterized, a simple resistor may be used in place of constant current source 306. While FIG. 6 shows capacitor 308 between antenna 310 and diode 302, capacitor 308 may be eliminated at the risk of exposing a DC control point; capacitor 308 provides DC isolation while providing a low impedance path for RF energy.

Where the embodiment of FIGS. 5 and 6 use control lines external to cables 210 220, the embodiment of FIG. 7 runs the DC control voltage along cables 210 and 220. Switch 400 selects between a positive and a negative voltage which is placed on cables 220 210 through choke 402, which passes DC but blocks RF. DC return is through the shield 250 of cables 210 220. Receiver 200 now connects to cables 210 220 through blocking capacitors 404 406 which block the DC control voltage, but pass RF. Switched nodes 410 420 connect between the central conductor of cable 220 and the outer shield 430 230. The polarity of PIN diodes 412 422 and current sources 416 426 is reversed between nodes 410 and 420, such that node 410 is on, providing a low impedance path to RF, when node 420 is off, and vice versa. As the DC path is between the center conductor of cable 220 and its shield 230, the need for components completing the DC path, 342 344 of FIGS. 5 and 6 is eliminated. Again, simple resistors may also be used in place of constant current sources 416 426.

It should be noted that receiver 200 may perform other functions. For example, a micro-cellular base station could incorporate this location technology as part of the normal receiver chain. This would allow cellular signals to be precisely located within tunnels and buildings.

Similarly, the cables used may perform other functions. As an example, a in a network cable having multiple twisted pairs, individual conductors or pairs could be used to determine the location of unwanted interference. One or more optical fibers in a wiring bundle could be periodically exposed through the cable jacket, providing leak points 222 of FIG. 3. In network environments such as standard deployments of twisted-pair cabling for 100 Base-T Ethernet only two of the four twisted-pairs are used for signaling. One or more of the unused wires could be periodically teased out of the cable jacket and used with the present invention.

While the embodiments of the present invention have been illustrated in detail, it should be apparent that modifications and adaptations to these embodiments may occur to one skilled in the art without departing from the scope of the present invention as set forth in the following claims.

The invention claimed is:

1. A system for detecting the location of a signal produced by an emitter, comprising:
   a receiver having a first and a second input channel and corresponding first and second output signals,
   first and second leaky signal cables connected to the first and second receiver inputs, the signal cables arranged so that leak points in each signal cable are adjacent, and
   a signal processor connected to the first and second receiver output signals for detecting differences between the first and second output signals and producing an output signal representative of the location of the emitter.

2. The system of claim 1 where the first and second leaky signal cables have different propagation velocities and similar distances between leak points.

3. The system of claim 1 where the first and second leaky signal cables have the same propagation velocity.

4. The system of claim 3 where the distance between leak points on the first signal cable is greater than the distance between leak points on the second signal cable, and the signal cables are arranged such that corresponding leak points on the first and second signal cables are adjacent.

5. The system of claim 1 where the first and second leaky signal cables are electrical cables.

6. The system of claim 5 where the first and second leaky signal cables are coaxial cables.

7. The system of claim 5 where the first and second leaky signal cables are twisted-pair cables.

8. The system of claim 1 where the first and second leaky signal cables are optical cables.

9. A system for detecting a signal produced by an emitter, comprising:
   a receiver having a first and a second input channel and corresponding first and second output signals;
   a signal cable loop connected to the first and second receiver inputs, the signal cable loop having leak points; and
   a signal processor connected to the first and second receiver output signals for detecting differences between the fist and second output signals and producing an output signal representative of the location of the emitter.

10. The system of claim 9 where the leak points in the signal cable loop are spaced uniformly along one half of the signal cable loop.

11. The system of claim 9 where the leak points in the signal cable loop are spaced in alternating fashion along both halves of the signal cable loop.

12. The system of claim 9 where the signal cable loop comprises an electrical cable.

13. The system of claim 12 where the signal cable loop comprises a coaxial cable.

14. The system of claim 12 where the signal cable loop comprises a twisted-pair cable.

15. The system of claim 12 where the leak points are passive.

16. The system of claim 12 where the leak points comprise RF switches.

17. The system of claim 16 where the RF switches are controlled by control lines separate from the signal cable loop.

18. The system of claim 16 where the RF switches are controlled by control signals passed on the signal cable loop.

19. The system of claim 16 where the leak points comprising RF switches are controlled in sequential groups.

20. The system of claim 16 where the leak points comprising RF switches are controlled in groups according to distance.

21. The system of claim 9 where the signal cable loop comprises an optical cable.

22. A method of detecting the location of a signal produced by an emitter, the method comprising:
   receiving the signal through two leaky signal cables connected to a two channel receiver, the leak points on the signal cables being adjacent; and
   processing differences between the outputs of the two channel receiver to produce a signal representative of the location of the emitter.

23. The method of claim 22 where the leaky signal cables are electrical cables.

24. The method of claim 23 where the leaky signal cables are coaxial cables.

25. The method of claim 23 where the leaky cables are twisted-pair cables.

26. The method of claim 22 where the leaky cables are optical cables.

27. The method of claim 22 where the propagation velocity of the two leaky cables is different.

28. The method of claim 22 where the propagation velocity of the signal in the two leaky cables is the same.

29. The method of claim 28 where a distance between leak points on one of the two cables is greater than a distance between leak points on the other cable, and the cables are arranged such that corresponding leak points are adjacent.

30. A method of detecting the location of a signal produced by an emitter, the method comprising:
   receiving the signal through a leaky signal cable loop connected to a two channel receiver; and
   processing differences between the outputs of the two channel receiver to produce a signal representative of the location of the emitter.

31. The method of claim 30 where the leak points in the signal cable loop are spaced uniformly along one half of the cable.

32. The method of claim 30 where the leak points in the signal cable loop are spaced in alternating fashion along both halves of the cable.

33. The method of claim 30 where the leaky signal cable is an electrical cable.

34. The method of claim 33 where the leaky signal cable is a coaxial cable.

35. The method of claim 33 where the leaky signal cable is a twisted-pair cable.

36. The method of claim 33 where the leak points are passive.

37. The method of claim 33 where the leak points comprise RF switches.

38. The method of claim 37 where the RF switches are controlled by control lines separate from the signal cable.

39. The method of claim 37 where the RF switches are controlled by control signals passed on the signal cable.

40. The method of claim 37 where the RF switches are controlled in sequential groups.

41. The method of claim 37 where the RF switches are controlled in groups according to distance.

42. The method of Claim 30 where the leaky signal cable is an optical cable.

* * * * *